3,086,321
METHOD OF INCREASING FLOW OF GUMS
AND OLEORESINS FROM TREES
Willie C. Wade, P.O. Box 6, Stockton, Ga.
No Drawing. Filed Oct. 3, 1961, Ser. No. 142,480
1 Claim. (Cl. 47—10)

This invention relates to a method of increasing the flow of gums, oleoresins and the like from coniferous trees.

An object of the present invention is to provide a method of increasing the flow of gums and oleoresins from coniferous trees wherein a stimulant is employed which, when applied to the wounds inflicted upon trees, produces a copious flow of said gums and oleoresins.

Another object of the present invention is to provide a method of increasing the flow of gums and oleoresins from coniferous trees in which a stimulant of novel composition is employed.

A further object of the present invention is to provide a method of increasing the flow of gums and oleoresins from coniferous trees which is simple in execution, highly effective in action, and commercially feasible.

Briefly stated, the method of the present invention comprises applying to wounds in the bark of coniferous trees, a stimulant.

The coniferous trees to be treated according to the present invention are first subjected to a treatment to inflict wounds in the bark thereof. This may be effected by making an incision in the bark of the tree as by notching or scratching, or the like.

The stimulant employed is a liquid and consists of sulfuric acid, kerosene and mineral oil. The mineral oil is that commonly known as No. 1 heating oil. The sulfuric acid is dilute and of 50% strength and is present in a preponderating amount while the kerosene and light mineral oil are each present in a fraction of said amount. Preferably, the stimulant consists of 6 parts by volume of dilute sulfuric acid of approximately 50% strength, 1 part by volume of kerosene and 1 part by volume of light mineral oil.

The stimulant is applied to the wounds of the trees as by directing a spray of such stimulant in and about the wound of the tree as well as about the area of the bark surrounding the wound.

A specific embodiment of the composition of the stimulant employed is comprised of the following ingredients and the parts by volume of the named ingredients:

96 ounces by volume of sulfuric acid of approximately 50% strength,
16 ounces by volume of kerosene,
16 ounces by volume of light mineral oil,
Trace of or .0053 ounce by volume of sodium dichromate.

The sulfuric acid acts as the stimulus while the kerosene functions to retain the acid in and about the wound and the neighboring area of the bark and as a repellant for insects. The light mineral oil acts to impart penetrating power to the stimulant by causing the applied stimulant to penetrate the wound of the tree and thereby cause the gum and oleoresin to exude from the wound within seconds after application, rather than several hours thereafter. In addition, the light mineral oil acts to prevent the liberation of the moisture from the surface of the tree, and, therefore, keep the tree surface or bark moist, and assist or abet the flow of gum or oleoresin.

The sodium dichromate which is present only as a trace functions to impart color to the stimulant, and also, as a rust preventative to metal spray guns if such are employed for spraying the stimulant upon the wounds of the trees.

The thus described stimulant, when applied to the wounds of the coniferous trees, causes a copious flow of gums and oleoresins sooner and faster than would be the case without the use of such stimulant.

What is claimed is:

The method of obtaining gums, oleoresins and the like from coniferous trees comprising applying, to wounds in the bark of said trees, a stimulant consisting of 6 parts by volume of dilute sulfuric acid of approximately 50% strength, 1 part by volume of kerosene, and 1 part by volume of light mineral oil, commonly known as No. 1 heating oil.

No references cited.